March 26, 1957   C. C. DUNGFELDER ET AL   2,786,479
BOTTLE CENTERING CUP ASSEMBLY
Filed Oct. 10, 1952   2 Sheets-Sheet 1
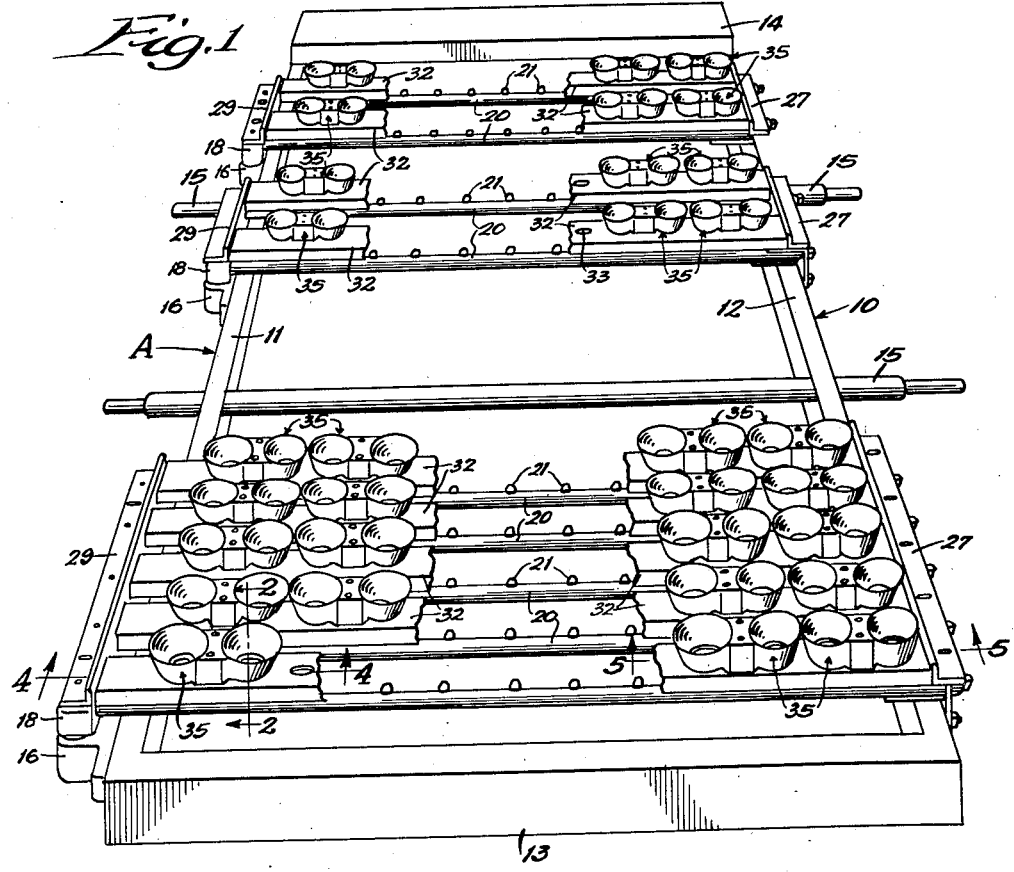
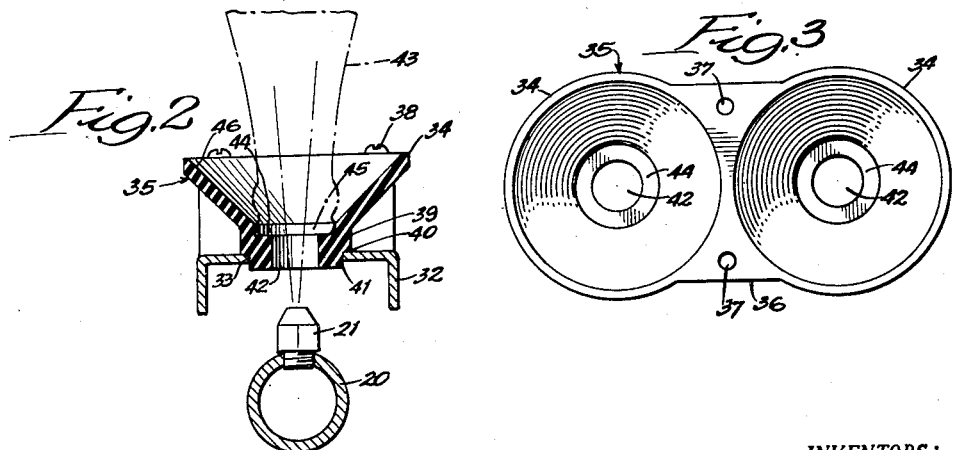
INVENTORS:
Chris C. Dungfelder
and Chester A. Siver,
BY Dawson, Tilton & Graham,
ATTORNEYS.

March 26, 1957  C. C. DUNGFELDER ET AL  2,786,479
BOTTLE CENTERING CUP ASSEMBLY
Filed Oct. 10, 1952  2 Sheets-Sheet 2
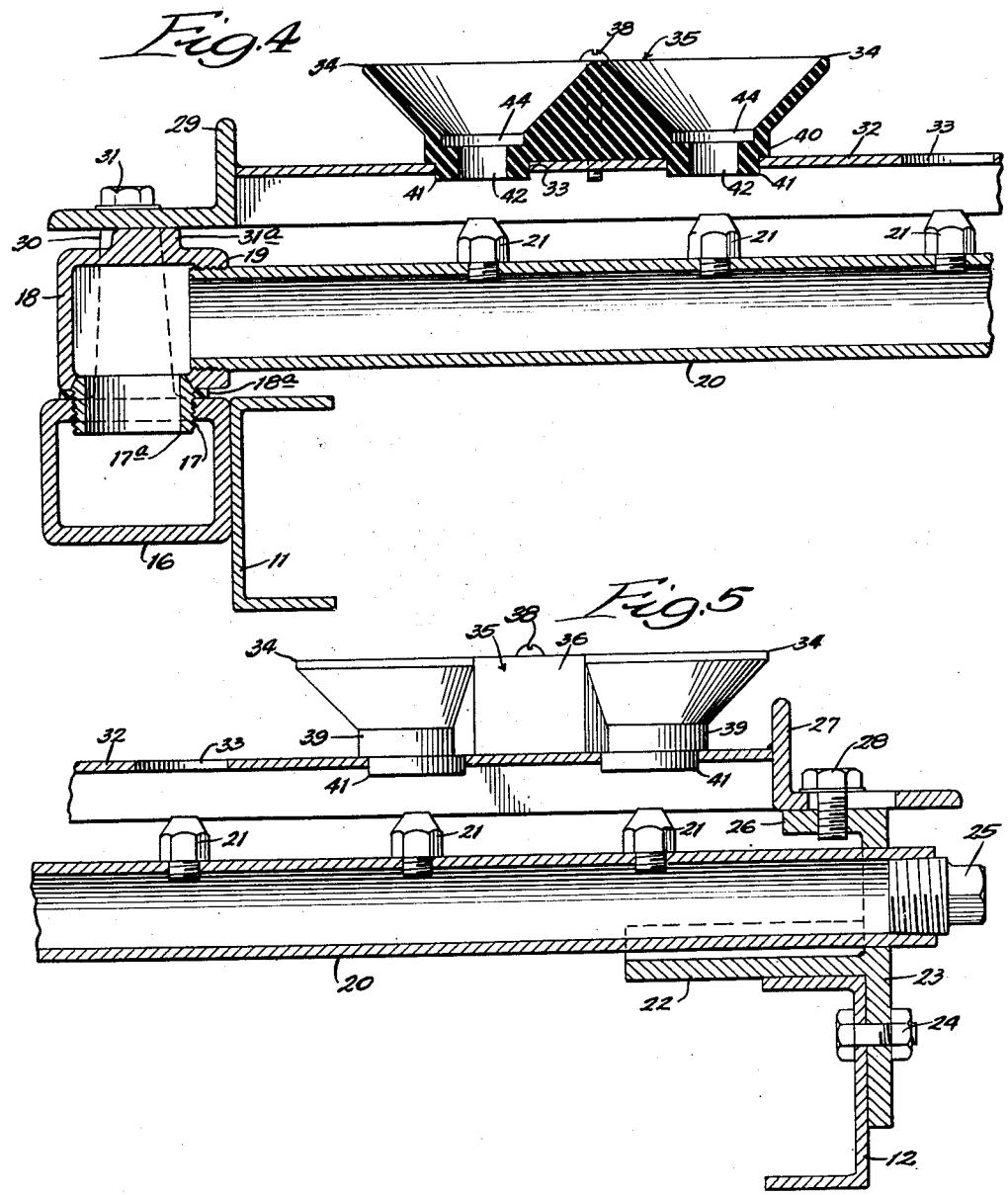
INVENTORS:
Chris C. Dungfelder
and Chester A. Siver,
BY Dawson, Tilton & Graham,
ATTORNEYS.

United States Patent Office 2,786,479
Patented Mar. 26, 1957

2,786,479

BOTTLE CENTERING CUP ASSEMBLY

Chris C. Dungfelder, La Grange, and Chester A. Siver, Hinsdale, Ill., assignors, by mesne assignments, to Barry-Wehmiller Machinery Company, St. Louis, Mo.

Application October 10, 1952, Serial No. 314,134

5 Claims. (Cl. 134—72)

This invention relates to a bottle centering cup assembly having particular utility in hydro type automatic bottle washers.

In bottling plants, bottles are washed and otherwise conditioned prior to being filled with prepared beverages, and such operations are usually carried out in automatically operated washing apparatus. A common type of conditioner is the hydro type bottle washer wherein bottles are inserted at an infeed station into pockets provided by a continuous carrier or conveyor. Normally a plurality of pockets in side-by-side relation are provided so that bottles are advanced through the apparatus in banks; the number of pockets and bottles in a bank depending upon the desired capacity of the machine.

The continuous conveyor or bottle carrier moves the bottles through the apparatus where the bottles are bathed and subjected to high pressure flushing, both operations being carried out with a hot caustic solution to remove all loosened film. Next the bottles are rinsed internally and externally to remove the loose film and are finally rinsed again with fresh water prior to being discharged in a clean condition suitable for filling.

To effectively flush and rinse the bottles it is important that each bottle be in line with a spray nozzle so that the mouths of the bottles, which are inverted during these operations, be directly above the nozzles for the spraying. Aligning or the centering of the nozzles with the bottles is accomplished by a centering cup assembly which is mechanically lifted in timed relation with the movement of the bottle conveyor to bring a centering cup into engagement with each bottle and thereby align it with a nozzle, which in turn is aligned with a centering cup. The movement of the centering cup assembly must be accurately adjusted so that the impact between the centering cups and bottles is not too pronounced, as otherwise the bottle crowning or locking ring may be chipped or cracked, making the bottle unfit for packaging carbonated beverages which must be maintained under pressure.

In automatic apparatus of the type described, it frequently happens that bottles are misaligned with respect to the centering cups and the impact of the centering cups against the bottles, particularly at high operating speeds, often operates to force the misaligned bottles sidewise with respect to the spray nozzle and it can be expected that the bottle and particularly the locking ring thereof will be cracked or chipped, rendering it unfit for use. Further, the bottle may be wedged in a carrier pocket by the impact of the centering cup and the bottle carrier may be twisted or bent, making its replacing necessary. Misalignment of the bottles with respect to the centering cup may occur, for example, when the carrier or conveyor chain is worn, when the bottle carriers are not properly adjusted to center the bottles, if the carrier is slightly distorted or out of alignment, and for other reasons.

Since these difficulties create serious problems, it is accordingly an object of this invention to provide a centering cup assembly that will tolerate considerable misalignment of the bottles and avoid the undesirable results encountered in prior apparatus. Another object of the invention is to provide in a bottle centering cup assembly centering cups that will yield slightly when subjected to distorting forces imposed by the impact with a misaligned bottle, to protect the bottles, carriers, etc., from damage, and that will be restored to their prior condition when the distorting forces are removed.

A further object is that of providing a plurality of bottle centering cups positively locked in alignment with the spray nozzles, all carried by a movable centering cup assembly, and that are resilient so as to yield slightly when subjected to distorting forces resulting from the impact with misaligned bottles and that will spring back to proper position upon removal of the distorting forces, while at the same time the cups are sufficiently hard and rigid to resist wedging of the bottle mouths therein during normal operation. Still another object is to provide a plurality of centering cup sections mounted in positive alignment upon a centering cup assembly; each section consisting of two cups formed integrally with a securing block, whereby distorting force applied to one of the cups is distributed throughout the section and the forces acting to restore the distorted cup stem from the whole section. Additional objects and advantages will appear as the specification proceeds.

The invention is shown in an illustrative embodiment by the accompanying drawings, in which—

Figure 1 is a perspective view of a bottle centering cup assembly; Fig. 2 is an enlarged cross-sectional view taken on the line 2—2 of Fig. 1; Fig. 3 is an enlarged top plan view of a centering cup section; Fig. 4 is an enlarged broken sectional view taken on the line 4—4 of Fig. 1; and Fig. 5 is an enlarged broken sectional view taken on the line 5—5 of Fig. 1.

In bottle washing lines, bottles are placed in pockets provided by a bottle carrier and are advanced by the carrier through the apparatus where various cleaning operations are performed. As part of the cleaning steps, the bottles are subjected to flushing and rinsing sprays provided by nozzles. At the spray stations the bottles are generally inverted and centering cups move against the bottles to properly align the mouths thereof with the spray nozzles. A bottle centering cup assembly which includes nozzles and centering cups is illustrated in Fig. 1 and is designated generally by the letter A. An illustration and detailed description of a complete washer is not given since they are well known in the art and the general description set out above is believed sufficient for purposes of this invention.

The centering cup assembly consists of a frame 10 consisting of U-shaped channels 11 and 12 forming side walls and similar channels 13 and 14 forming end walls thereof. A pair of elongated shafts 15 extend transversely of the frame in spaced relation and are supported by suitable means in spaced openings provided by the side walls 11 and 12. The shafts 15 are mounted within a bottle washer and are so arranged with the operative parts thereof that the assembly A is moved upwardly in timed sequence with the movement of the bottle carrier to bring the centering cups against the mouths of bottles at the spray stations to align the same with the spray nozzles.

Referring to Fig. 4, it is seen that a manifold or supply pipe 16 is rigidly carried on the outer edge of the side wall 11. Any suitable means may be used to secure the manifold and side wall 11 together so long as the walls of the manifold are not perforated, since this member is a conduit for water and other cleaning solutions. The manifold 16 is elongated and is equipped with a plurality of spaced apertures or openings 17 which are threaded to receive short threaded nipples 17a that protrude above the manifold slightly, and serve as a dowel or aligning nipple over which the end casting or L-shaped fittings 18 slide and seal against gaskets 18a. The seal against the gasket is made secure by drawing the fitting toward the manifold in a manner to be described. This construction enables quick and easy removal of the entire spray pipe and nozzle assembly. A lateral edge portion 19 of the fitting 18 is threaded and receives the threaded end of a conduit or spray pipe 20 which is equipped with a plurality of spaced-apart spray nozzles 21. In the illustration the nozzles 21 are threaded and are received within threaded apertures provided by the conduit 20; however, any suitable means of attachment may well be used.

At its opposite end the pipe 20 is carried in an arcuate pipe support 22 welded to a strap member 23. The strap 23 is secured at its lower end by means of bolts 24 to the side wall 12. A plug 25 closes the end of the pipe 20.

By reference to Fig. 1 it is seen that a plurality of spray pipes 20 are carried by the frame 10. Any number of spray pipes desired may be supported upon the frame and any suitable spacing or arrangement necessary to accommodate the requirements of a particular bottle washing machine may be used. Normally the manifold 16 will extend along the frame 10 a distance at least equal to the spacing between the outer spray pipes in any cluster. Further, an L fitting 18 will be provided for each spray pipe.

The strap 23 is turned inwardly at its upper end to provide a flange or edge portion 26. An L-shaped elongated channel 27 is received upon the upper surface of the flange 26 and is secured thereto by cap screws 28.

Referring to Fig. 4, it is seen that a similar arrangement is provided wherein an elongated L-shaped channel 29 is supported upon a plurality of spaced posts 30, and secured thereto by cap screws 31. The posts 30 are carried in spaced-apart relation upon the manifold 16 and are rigidly secured thereto by welding or otherwise. Spacers 31a force the fittings 18 into sealing relation with the gaskets 18a upon tightening of the cap screws 31. The openings in the channels 27 and 29 receiving respectively the cap screws 28 and 31 are elongated to permit slight lateral shifting of the channels for purposes of alignment.

The L-shaped channel supports 27 and 29 carry a U-shaped channel support 32 extending therebetween. Preferably the support 32 is welded to the vertical legs of the channels 27 and 29, although other modes of attachment may be used. The U-shaped support member 32 is equipped with a plurality of spaced-apart openings or apertures 33 that are centrally aligned with each of the spray nozzles 21. A centering cup 34 for each of the apertures 33 and nozzles 21 is carried by the support 32. As seen in Fig. 1, a support member 32 is provided for each of the spray pipes 20 and extends transversely of the frame 10 in parallel spaced relation with each of the spray pipes. Also a centering cup 34 is provided for each spray nozzle.

Any suitable means may be employed for supplying fluid under pressure to the manifold 16 and thereby to the spray pipes 20. Preferably, flexible conduits (not shown) may be used for this purpose, although other forms of connectors may also be used.

The centering cups 34 are formed in sections 35 consisting of two cups formed integrally with a spacer or securing block 36. The spacer 36 is provided with two elongated passages 37 which are adapted to receive bolts 38 which secure the sections 35 to the support members 32. The sections 35 are preferably both yieldable and resilient and may be made from any suitable material having these properties, such as molded rubber. It is also preferred that the material be able to withstand the cleansing solutions and temperatures in the washing apparatus without cracking or otherwise deteriorating. If molded rubber is used, the rubber should be properly cured to withstand such usage. Though it is preferred that the pockets be both yieldable and resilient, it is important that they be sufficiently hard or rigid to prevent wedging of the bottle necks within the cups during normal operation. It has been found that molded sections of relatively hard and properly cured rubber are very satisfactory.

The pockets 34 are frusto conical in shape both interiorly and exteriorly. The cups are equipped with a depending portion 39 providing a shoulder 40 adapted to abut the support 32 and a restricted neck portion 41 adapted to extend through the openings 33 in the support member 32 and to substantially abut the periphery thereof. A spray opening or passage 42 is provided in the cup and is centrally aligned with the nozzle 21 so that the jet of fluid spraying therefrom will pass readily through the passage and to the interior of a bottle 43 centered in the cup. A shoulder 44 adjacent the upper end of the passage 42 receives the locking or crowning ring 45 of the bottle 43. The sloping inner side walls 46 of the cup 34 taper inwardly and terminate in the annular shoulder 44 so that the mouth of a bottle is guided by the impact of a centering cup against the bottle mouth into position on the annular shoulder 44 where the mouth is aligned with the jet or nozzle 21. As seen best in Fig. 4, the spacer or securing block 36 has a lower surface that terminates adjacent the shoulder 40 and abuts the support member 32 when the section 35 is in position upon the support member with the necks 41 of the centering cups extending through the openings 33 of the support member. Tightening of the bolts 38 thereby firmly secures the section in proper position upon the support member.

In operation, bottles are advanced through the bottle washing apparatus and at certain stages of the washing operations are passed through stations where the bottles are subjected to spray operations. At the spraying stations the bottles are inverted so that the mouths thereof are pointed downwardly. The centering cup apparatus A is supported by the shafts 15 in the apparatus so that the entire assembly is moved upwardly and the centering cups 34 are moved against the bottles to center the same with respect to the spray nozzles 21. After a predetermined interval in which the bottles are thoroughly sprayed, the assembly A is moved downwardly to free the bottles from the centering cups and the conveyor of the washing apparatus carries the bottles to a subsequent station.

It is noted in Fig. 1 that the centering cups and spray pipes 20 are mounted in clusters upon the frame 10, each cluster being spaced from the others. The clusters may correspond to stations in the washing apparatus; for example, the cluster having the greatest number of spray pipes 20 and centering cups may represent the high pressure flushing station where a mild caustic solution is sprayed into the bottles to remove all loosened film therefrom. The second and third cluster may represent rinsing stations, the first being an intermediate rinse while the last cluster supplies the final rinse. Where the support clusters or stations are mounted upon a single frame 10, the flushing, intermediate rinsing and final rinsing operations may be carried on simultaneously. Thus while a first group of bottles are being flushed, a second group is being subjected to an intermediate rinse while the last group of bottles are receiving the final spray rinse.

The centering cups are preferably formed in sections of two and may be molded so that the spacer 36 is joined integrally with the two centering cups in a section. The material used should be both yieldable and resilient to that the cup structure will give or yield slightly when subjected to distorting forces and will quickly restore itself upon removal of the forces. At the same time, it is desired to have the centering cups sufficiently rigid so that the impact between the cups and the bottles will not wedge the mouths or necks of the bottles into the centering cups. It has been found that suitably cured rubber having such properties may advantageously be used.

In normal operation the bottles are nearly aligned with the nozzles 21 when carried into the spraying station by the bottle washer conveyor. The centering cups are moved upwardly and the mouths of the bottles easily slide into engagement with the annular shoulder 44 whereby the bottles are accurately aligned with the nozzles 21. In the event that the bottles are badly misaligned with the nozzles when in the spraying stations, the upward movement of the assembly A will impact the centering cups against the bottles and since the cups are yieldable the cups will give slightly while at the same time exerting forces upon the bottle, tending to bring it into proper alignment. Since the cups are formed in sections of two spaced apart by a spacer or securing member 36, the distorting force caused by the bottle will be transferred throughout the entire section and the restoration or aligning forces will therefore be applied to the whole section. Thus, relatively severe bottle misalignment is tolerated without damage to the apparatus or to the bottles and at the same time the factors resulting in the tolerance are operative to move the bottles into proper alignment. Since the necks 41 extend through the openings 33 and substantially abut the peripheries thereof, the necks cooperate with the spacer 36 to positively seat and hold upon the seats the centering cups, even against the distorting forces resulting from misaligned bottles.

The invention results in substantial savings, since the costs and difficulty of replacing bottles normally broken during the washing operation are reduced, as are also the costs of replacing damaged bottle carriers. Moreover, centering cup sections are quickly and easily replaced when this is necessary by simple removal of the bolts 38. Shutdown time for centering cup replacement is therefore minimized.

While in the foregoing specification specific details of the invention have been set forth for purposes of illustration, it will be apparent to those skilled in the art that many of these details can be varied widely without departing from the spirit of the invention.

We claim:

1. In a centering cup assembly adapted for use in bottle washers and the like, a frame, a plurality of spray conduits carried on said frame in spaced apart relation and being equipped with a plurality of spaced apart upwardly directed spray nozzles, a plurality of support members mounted upon said frame above each of said spray conduits and each support member having a plurality of openings therein in axial alignment with the spray nozzles, a plurality of centering cup sections secured to said support, said sections comprising resilient centering cups having a depending neck portion extending through the openings in said support members, whereby said centering cups are positively aligned with said spray nozzles and are adapted to yield slightly when subjected to distorting forces and to restore themselves when the forces are removed, said cups having flange portions about the neck portions thereof seating upon said support, said centering cups being frusto-conical in shape and the inclined inner wall thereof terminating in an annular shoulder adapted to receive the mouth of a bottle.

2. In bottle washer apparatus in which bottles are carried by a conveyor and are advanced thereby from station to station in a washing operation, a bottle centering cup assembly at one of the stations adapted for movement to bring the centering cups thereof into engagement with bottles carried by the conveyor comprising a frame, at least one spray conduit carried by said frame and being equipped with spray nozzles, said conduit being adapted to be connected to a source of fluid under pressure to provide a jet of fluid emanating from each nozzle, a support member carried by said frame and extending over said conduit, said support member having openings extending therethrough in alignment with the respective spray nozzles, and a centering cup section comprising at least two centering cups formed integrally with a spacer therebetween, said spacer being secured to said support member, each of said cups having a restricted neck portion extending through the respective openings in said support member and in alignment with the respective spray nozzles, and each of said cups having an outwardly extending flange adjacent the neck thereof and seating upon said support member, each of said cups being resilient and slightly yieldable for accommodating distorting forces applied thereto by the insertion of misaligned bottles thereinto and being adapted to restore itself after such forces are removed.

3. In bottle washer apparatus wherein bottles are advanced through a plurality of stations in a washing operation, a bottle centering cup assembly at one of said stations for receiving bottles advanced into such station comprising a frame, conduit means carried by said frame and being equipped with a plurality of spray nozzles for discharging liquid spray jets, a support member carried by said frame in alignment with said conduit means and having openings therein aligned with the respective spray nozzles, and a centering cup section comprising at least two centering cups with a spacer therebetween, said centering cups and spacer being integrally formed and being secured to said support member, each of said cups having a restricted neck portion extending through an opening in said support member, each of said cups having an outwardly extending flange adjacent its neck and seating against said support member, each of said cups being also resilient and slightly yieldable for accommodating distorting forces applied thereto but being adapted to restore itself after such forces are removed.

4. In a centering cup assembly adapted for use in bottle washers and the like, wherein a plurality of spaced apart spray nozzles are oriented to spray liquid under pressure into the interior of bottles in a washing operation, support members having a plurality of openings therein for axial alignment with such respective spray nozzles, and a plurality of centering cup sections secured to said support members, each section comprising resilient centering cups having a depending neck portion extending through the respective openings in said support members whereby said centering cups are positively positioned for alignment with such spray nozzles and are adapted to yield slightly when subjected to distorting forces and to restore themselves when the distorting forces are removed, said cups having flange portions above the neck portions thereof seating upon said support members, said centering cups being generally frusto-conical and terminating in an annular shoulder adapted to receive the mouth of a bottle, each centering cup section comprising a resilient body having formed integrally therewith a pair of centering cups and an integral spacer extending therebetween.

5. In a centering cup assembly adapted for use in bottle washers and the like, a frame, a plurality of spray conduits carried on said frame in spaced apart relation and being equipped with a plurality of spaced apart upwardly-directed spray nozzles, a plurality of support members mounted upon said frame above each of said spray conduits and each support member having a plurality of openings therein in axial alignment with the spray nozzles, a plurality of centering cup sections secured to said support, said sections comprising molded centering cups of plastic material having a depending neck portion extended through the openings in said support members and being sufficiently hard to prevent wedging of the bottle necks therein, whereby said centering cups are positively aligned with said spray nozzles for centering the neck portions of the bottles with respect to said nozzles, said cups having flange portions about the neck portions thereof seating upon said support, said centering cups being frusto-conical in shape and the inclined inner wall thereof terminating in an annular shoulder adapted to receive the mouth of a bottle.

References Cited in the file of this patent

UNITED STATES PATENTS

| | | |
|---|---|---|
| 1,140,698 | Merrigan | May 25, 1915 |
| 1,513,628 | Risser | Oct. 28, 1924 |
| 1,584,913 | Wilson | May 18, 1926 |
| 1,761,450 | McKechnie | June 3, 1930 |
| 2,168,395 | Damkroger | Aug. 8, 1939 |
| 2,222,676 | Mahler | Nov. 26, 1940 |
| 2,263,627 | Herold | Nov. 25, 1941 |
| 2,314,048 | Ladewig | Mar. 16, 1943 |
| 2,385,050 | Becker | Sept. 18, 1945 |
| 2,466,899 | Kincaid | Apr. 12, 1949 |
| 2,517,759 | Bentzen | Aug. 8, 1950 |
| 2,671,457 | Cozzoli | Mar. 9, 1954 |
| 2,671,742 | Cozzoli | Mar. 9, 1954 |
| 2,691,381 | Strunk | Oct. 12, 1954 |